(12) United States Patent
Kato

(10) Patent No.: US 6,276,340 B1
(45) Date of Patent: Aug. 21, 2001

(54) ENGINE INJECTION CONTROL

(75) Inventor: Masahiko Kato, Shizuoka (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/461,955

(22) Filed: Dec. 15, 1999

(30) Foreign Application Priority Data

Dec. 15, 1998 (JP) .................................................. 10-355673

(51) Int. Cl.$^7$ .................................................. F02M 51/00
(52) U.S. Cl. .................... 123/491; 123/490; 123/179.16; 123/179.17; 361/152; 361/153
(58) Field of Search ..................... 123/305, 685, 123/690, 467, 479, 490, 491, 381, 179.1, 179.16, 179.17, 179.8, 179.9; 701/107; 361/152, 153

(56) References Cited

U.S. PATENT DOCUMENTS

| 4,230,086 | 10/1980 | Lovret . | |
|---|---|---|---|
| 4,941,449 | * 7/1990 | hoptner et al. | 123/491 |
| 5,615,645 | 4/1997 | Kanno . | |
| 5,632,250 | * 5/1997 | Kato et al. | 123/490 |
| 5,752,488 | * 5/1998 | Hattori et al. | 123/491 |
| 5,954,033 | * 9/1999 | Moncelle | 123/467 |

* cited by examiner

Primary Examiner—Erick Solis
(74) Attorney, Agent, or Firm—Knobbe, Martens, Olson & Bear LLP

(57) ABSTRACT

An outboard motor engine includes a plurality of cylinders. A fuel injector is disposed to inject a charge of fuel into an intake system. The fuel injector can form a portion of a direct injection system or a manifold injection system. The engine includes a processor that cycles each of the fuel injectors prior to energizing a fuel pump, a starter motor, or another electrical component of the outboard motor. By energizing the fuel injectors in sequence, a higher level of voltage can be applied to each fuel injector. In addition, by energizing the fuel injectors prior to energizing other electrical components, a higher level of voltage can be applied to each fuel injector.

20 Claims, 9 Drawing Sheets

ENGINE INJECTION CONTROL

PRIORITY INFORMATION

This application is based on and claims priority to Japanese Patent Application Nos. 10-355673, filed Dec. 15, 1998.

BACKGROUND OF THE INVENTION

1. Field of the Invention

The present invention principally relates to fuel injected engines. More particularly, the present invention relates to a control strategy for controlling fuel injectors at the time of startup.

2. Description of the Related Art

In all fields of engine design, there is an increasing emphasis on obtaining more effective emission control, better fuel economy and, at the same time, continued high or higher power output. This trend has resulted in the substitution of fuel injection systems for carburetors as the engine charge former.

Fuel injection systems typically inject fuel into the air intake manifold. However, in order to obtain still better engine performance, direct injection systems are being considered. Direct fuel injection systems inject fuel directly into the combustion chamber. These systems potentially have significant advantages over typical fuel injection systems such as improved emission control.

In a direct injection system, a fuel injector is typically positioned in a cavity that is defined by a cylinder head. The nozzle of the fuel injector is exposed to the combustion chamber through an opening extending from the cavity so that the fuel may be injected directly into the combustion chamber.

In a manifold injection system, a fuel injector usually is disposed at a point along the induction system, downstream of a throttle device (e.g., a throttle valve). In many applications, the fuel injector is mounted at a location in close proximity to the combustion chamber, such as, for example, next to the intake port in a four-cycle engine. In this manner, fuel is injected into the air charge just before entering the combustion chamber.

The fuel injector, which is used with both direct and manifold injection systems, typically includes a needle valve that is actuated by an electromagnetic solenoid. The needle valve closes the nozzle of the fuel injector when the solenoid is deenergized. The needle valves mates with a valve seat to prevent passage of fuel across the valve. When the solenoid is energized, the needle valve moves away from the valve seat to form a clearance. Pressurized fuel is injected through this clearance, which typically is on the order of several-ten to several-hundred microns (i.e., micrometers).

In direction injection systems, as well as in some manifold injection configurations, the injector nozzle often is exposed to extremely high temperature which under some operating conditions can affect injector performance. For instance, a certain amount of liquid fuel, which contains heavy oil components, typically exists on the injector nozzle immediately after injection. If the heat in the injector nozzle exceeds the distillation temperature of the liquid fuel (for example, 90% of gasoline components evaporate at around 150°), the valve seat tends to dry and heavy oil components deposit on the valve seat and/or injector nozzle. Excessive deposits of the heavy oil components can gum the valve seat and needle valve. Such deposits can accumulate under some extreme operation conditions (e.g., extended running periods during hot weather) to a degree that causes the needle valve to stick with the valve seat. The resulting bond between the valve seat and the needle valve prevents the fuel injector, and hence the engine, from functioning properly, if at all.

This phenomenon is exacerbated with engines employed in outboard motors. An outboard motor engine commonly is disposed with its crankshaft in a vertical orientation. The cylinders and fuel injectors of the engine consequently assume a generally horizontal position. This arrangement of the fuel injectors often traps air within the fuel injectors, and consequently, the valve seat become dry more frequently. Increased deposits of the heavy oil components of the fuel thus occurs on the valve seats of fuel injectors in an outboard motor. Fuel injector stiction thus occurs more often with outboard motor engines than with engines used in other applications (e.g., with automobile engines).

SUMMARY OF THE INVENTION

The present invention involves the recognition that the bond between needle valves and valve seats of fuel injectors poses a particular problem at the time of startup. The bonds between the corresponding valve seats and needle valve are heightened above those occurring during normal operation because the valve seats have remained dry for an extended period with the engine stopped. Additionally, less voltage can be applied to the solenoids at the time of engine startup with an associated fuel pump and a starter motor of the engine running. A need therefore exists for approach to overcome the deposits bond that may occur between the corresponding needle valve and the valve seat, especially at the time of engine startup.

One aspect of the present invention involves a fuel injected, internal combustion engine comprising an engine body defining at least one cylinder bore in which a piston reciprocates, a cylinder head attached to an end of the cylinder bore so as to define a combustion chamber with said piston, a fuel injector selectively communicating with the combustion chamber to provide a fuel charge, an electronic controller coupled to the fuel injector and controlling the operation of the fuel injector, and at least one additional electrical component coupled to and controlled by the electronic controller, the electronic controller being configured to energize the fuel injector through at least one cycle before the electrical component is energized at the time of engine startup.

A preferred method of practicing one aspect of the present invention involves cycling each fuel injector of the engine by applying a voltage for a predetermined period to a solenoid of each fuel injector, energizing a fuel pump after cycling the fuel injectors, and energizing a starter motor after cycling the fuel injectors.

Further aspects, features, and advantages of the present invention will become apparent from the detailed description of the preferred embodiments which follow.

BRIEF DESCRIPTION OF THE DRAWINGS

The present invention will now be described with reference to the drawings of several preferred embodiments, which embodiments are intended to illustrate, but not to limit, the present invention, and which include the following figures.

DETAILED DESCRIPTION OF SEVERAL PREFERRED EMBODIMENTS OF THE PRESENT INVENTION

Figure 1:
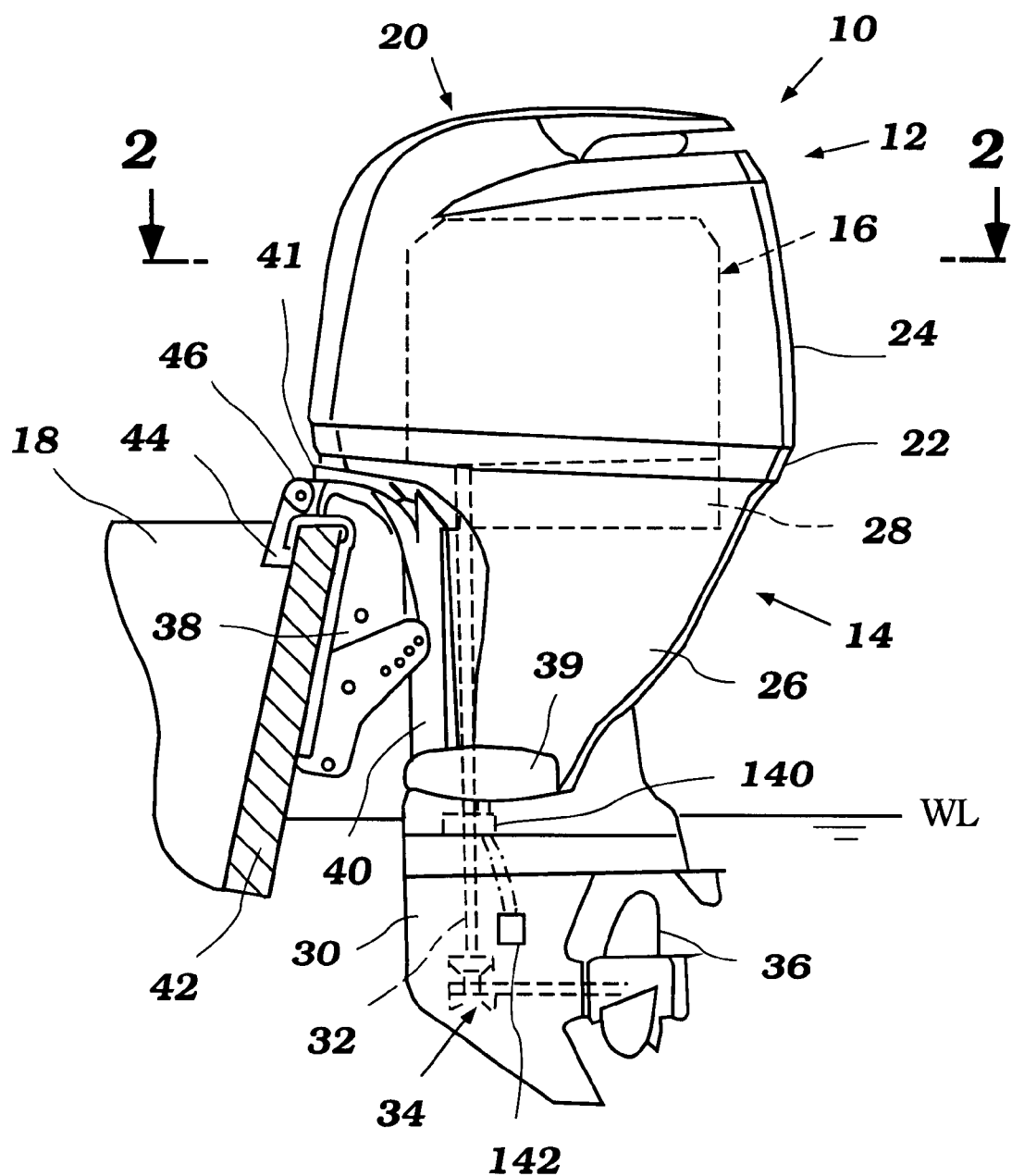
FIG. 1 is a side elevation view showing an outboard motor having an engine configured in accordance with certain features, aspects and advantages of the present invention.

With reference initially to FIG. 1, an outboard motor, indicated generally by the reference numeral 10, is illustrated therein. The illustrated outboard motor advantageously incorporates a fuel injection system configured and arranged in accordance with certain features, aspects and advantages of the present invention. The configuration and arrangement of the present invention results in improved operation of the engine over time as well as increased reliability of the fuel injection system. Although the fuel injector system is described below in connection with a variety of illustrated outboard motors, it should be understood that certain features, aspects and advantages of the present invention can also be used in other applications, such as, for example, but without limitation, stern-driven watercraft and a variety of other land-based vehicle and engine applications.

With continued reference to FIG. 1, the illustrated outboard motor 10 generally comprises a power head 12 and a drive shaft housing 14. The power head 12 preferably contains an internal combustion engine 16 that is used to power a watercraft 18 to which the outboard motor 10 is mounted. As will be described, the engine 16 preferably is mounted such that an output shaft (not shown) of the motor (i.e., a crankshaft) extends in a generally vertical direction when the motor 10 is placed in an operational position.

The power head 12 includes a protective cowling 20, which surrounds the engine 16 and generally comprises both a lower tray portion 22 and a removable main cover portion 24. The lower tray portion 22 and the main cover portion 24 preferably are connected to one another such that the main cover portion 24 can be pivoted or otherwise removed to allow access to the engine 16 contained within the cowling 20. More preferably, the two components 22, 24 are sealed together to substantially protect the engine 16 from excess water contact.

The illustrated lower tray portion 22 contains an exhaust guide plate 28, which will be described in more detail below. In the illustrated arrangement, the engine 16 is mounted to the exhaust guide plate 28 and thereby is mounted to the balance of the motor 10.

An apron 26 connects the illustrated power head 12 to the drive shaft housing 14. The apron 26 is positioned below the tray portion 22 in a manner well known to those of ordinary skill in the art.

The drive shaft housing 14 depends from the apron 26 and terminates in a lower unit 30. A drive shaft 32 extends through the housing 14 and transmits the rotational movement of the crankshaft 19 (see FIG. 3) to a transmission 34 that is positioned within the lower unit 30. The particular orientation of the illustrated engine 16 facilitates coupling of the drive shaft 32 to the crankshaft 19.

The transmission 34 desirably is a forward/neutral/reverse-type transmission so as to drive the watercraft 18 in any of these operational states. The transmission 34 selectively establishes a driving condition of a propulsion device 36. In the illustrated embodiment, the propulsion device 36 is a propeller. Of course, any other suitable propulsion device can also be used. For example, but without limitation, the propulsion device 36 could be a jet pump unit.

As is generally known to those of ordinary skill in the art, the present outboard motor 10 is attached to the watercraft 18 using a clamp and swivel bracket 38. The bracket 38 preferably is attached to the drive shaft housing 14 with at least one mount 39. The bracket 38 includes a swivel shaft 40 that extends in a generally vertical direction (i.e., generally parallel to the drive shaft 32) and allows the motor 10 to swivel about a turning axis. Steering movement occurs about this turning axis. A steering arm 41 can be connected to an upper end of the swivel shaft 40 and can extend in a forward direction for steering of the outboard motor 10.

The bracket 38 also allows the outboard motor 10 to be clamped or otherwise secured to the watercraft 18. Specifically, the clamping portion of the bracket 38 is adapted to attach to a transom 42 of the associated watercraft 18. The bracket 38 is arranged on the transom 42 at a location that supports the outboard motor 10 in a generally upright position and at a location where the propulsion unit 36 lies at least partially submerged beneath the surface of the body of water WL in which the watercraft is being operated. A screw 44, or other suitable fastening arrangement, is used to secure the motor 10 in position along the transom 42 of the watercraft 18.

The bracket 38 permits adjustment of a trim position of the outboard motor 10 and allows the outboard motor 10 to be tilted up for transportation or storage. For this purpose, a tilt and trim cylinder assembly desirably moves the outboard motor about a pivot shaft 46 of the bracket 38. This permits the outboard motor 10 to move within a normal range of positions relative to the transom 42 (i.e., between a generally upright position to a full tilt-up position).

Figure 2:
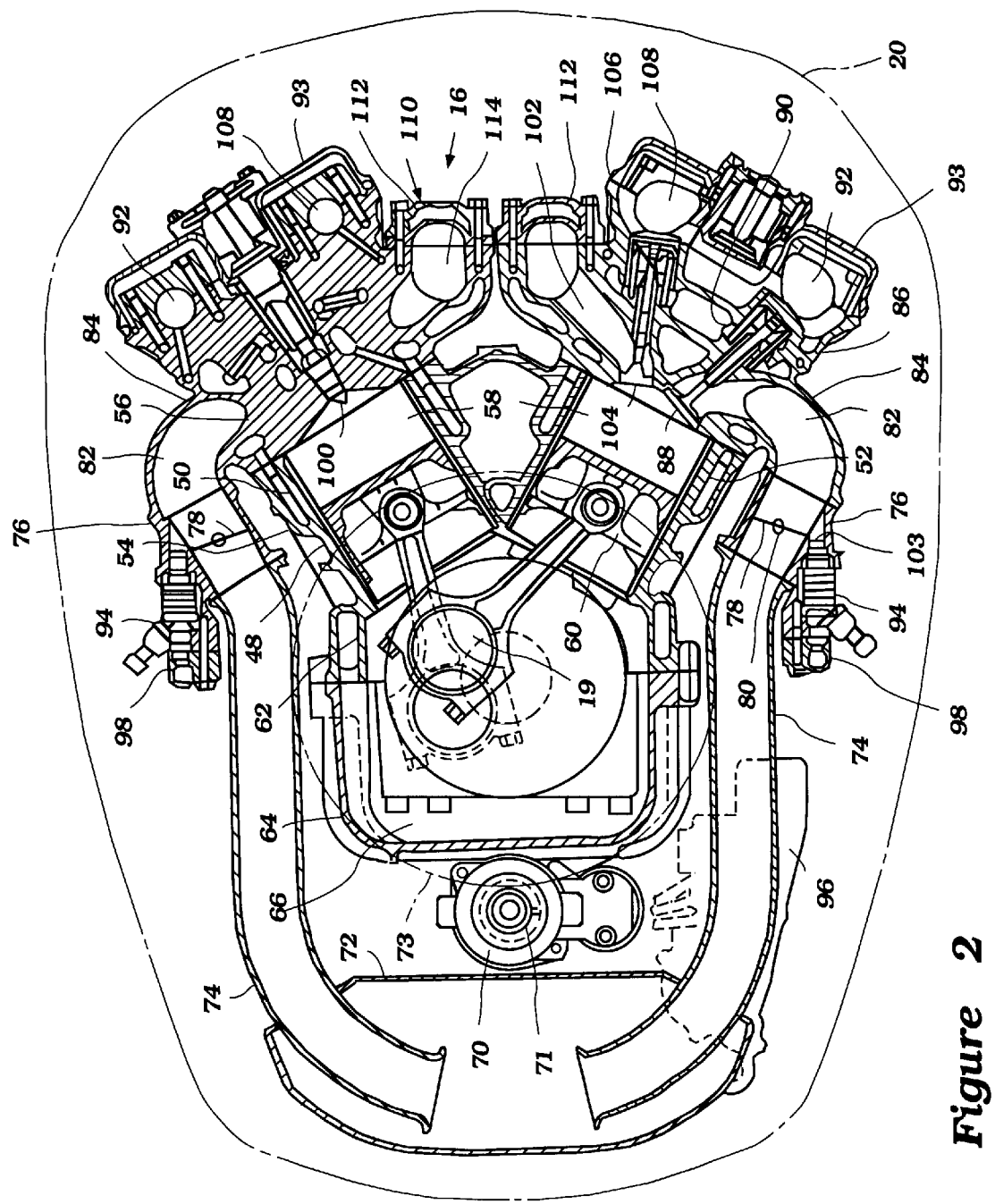
FIG. 2 is a sectioned top plan view of a portion of the outboard motor of FIG. 1 having a cowling illustrated in phantom line.

With reference now to FIG. 2, the illustrated engine 16 is preferably of a six-cylinder, four-cycle engine. More preferably, the engine 16 is arranged in a V-6 configuration, meaning that the engine 16 has six cylinders 48 arranged in two distinct inclined cylinder banks of three cylinders 48, which two banks 50, 52, together form at least a portion of a cylinder block 54. In some arrangements, the engine 16 can have a greater or lesser number of cylinders 48, such as two, four, eight or more. Additionally, certain aspects of the present invention can also be used with engines having other cylinder arrangements, for example, but without limitation, in-line.

In the illustrated arrangement, a set of cylinder head assemblies 56 are connected to the two banks 50, 52 that form at least a portion of the cylinder block 54. Beneath the cylinder head assemblies 56 lie a set of combustion chambers 58 that are defined by the recesses formed in a lower surface of the cylinder head assemblies 56, the cylinders 48 and a set of pistons 60.

The pistons 60 are movably positioned in each cylinder 48 and are adapted for reciprocating movement therein. Each of the pistons 60 is connected to a first end of a corresponding connecting rod 62. A second end of the connecting rod 62 is rotatably connected to a throw of the crankshaft 19. Thus, reciprocal movement of the pistons is transposed into rotational movement of the crankshaft 19.

The crankshaft 19 preferably is journaled for rotation with respect to the cylinder block 54. A crankcase cover 64 engages an end of the cylinder block 54 generally opposite the cylinder heads 56 and, together with the cylinder block 54, defines a crankcase chamber 66 enclosing the crankshaft 19.

Figure 3:
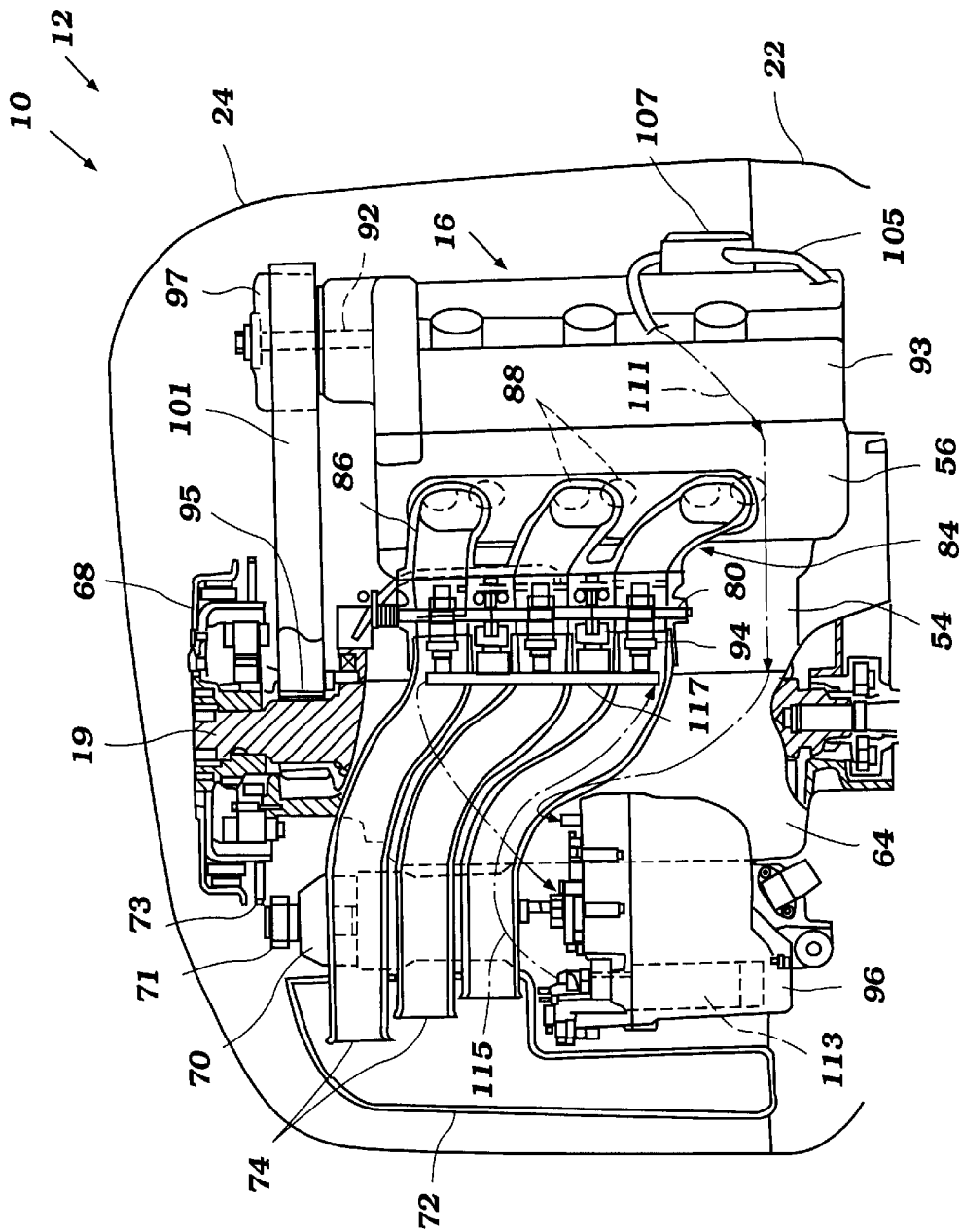
FIG. 3 is a partially sectioned side elevation view of the engine of the outboard motor of FIG. 1.

With reference now to FIG. 3, a flywheel 68 is positioned above the illustrated cylinder block 54 and is adapted to rotate with the crankshaft 19. A starter motor 70 preferably is positioned adjacent the crankcase 66. The starter motor 70 drives a gear 71 that selectively engages a starter ring portion 73 of the flywheel 68 to start the engine, as is well known in the art. It is to be understood that although the flywheel 68 is disposed at the top of the illustrated engine 16, other arrangements are also possible. For example, the flywheel 68 can be positioned at the bottom of the engine 16.

With reference now to FIGS. 2 and 3, an induction and fuel delivery system is provided for delivering fuel to each combustion chamber 58 for combustion therein. Generally, air is drawn by the induction system (i.e., as by suction caused by operation of the engine) through a vent (not shown) formed in the cowling 20. Preferably, the vent (not shown) is formed in an upper and rearwardly facing portion of the main cover portion 24 to reduce the induction of water or mist from the body of water in which the watercraft 18 is being operated.

From within the cowling 20, air is drawn into the balance of the induction system through an air intake chamber 72, or air silencer, positioned in a forward portion of the illustrated cowling 20. The air drawn from within the cowling 20 enters the illustrated intake chamber 72 through an air inlet (not shown) formed near the top of the intake chamber 72.

A plurality of intake pipes 74 lead from the intake chamber 72 for directing air from the intake chamber 72 to the combustion chambers 58 of the engine 16. In the illustrated arrangement, one intake pipe 74 is provided for each cylinder 48 such that only one intake pipe 74 communicates with any one combustion chamber 48. The illustrated intake pipes 74 wrap around a portion of the cylinder block 54 and feature a configuration substantially corresponding to a shape of the inside of the upper motor cowling 24. The intake pipes 74 and the intake chamber 72 can be made of resin or of aluminum by a die-casting method. These components 72, 74 also can be integrally formed (i.e., formed as a unitary piece).

A throttle body 76 is interposed between the intake chamber 72 and each combustion chamber 58. Preferably, the throttle bodies 76 are positioned proximate the cylinder head 56 as illustrated in FIG. 2. As illustrated, a throttle valve 78 can regulate flow through the throttle body 76 by rotating inside the throttle body 76 about a throttle shaft 80. Thus, the rotation of the throttle valve 78 acts to regulate a flow of air through the throttle body 76.

The throttle bodies 76 of each cylinder bank 50, 52 communicate with an intake manifold 82 associated with that cylinder bank 50, 52 of the engine 16. More specifically, each throttle body 76 communicates with an intake runner 84 of the intake manifold. The intake runner 84 leads to intake passages 86 formed in the cylinder head 56, which intake passages 86 lead to the combustion chambers 58 through corresponding intake ports 88.

In the illustrated engine 16, two intake ports 88 are associated with each combustion chamber 58. An intake valve 90 is supported by the cylinder head assembly 56 and is adapted to regulate the flow through each intake passage 86 and corresponding intake port 88. An intake valve camshaft 92 is journaled within the cylinder head assembly 56 below a cylinder head cover 93 and actuates the intake valve 90 in a reciprocating manner, as is known in the art.

The camshafts 92 are driven for rotation by a belt drive 95 in the illustrated arrangement. The belt drive 95 generally comprises a drive pulley 97 and a driven pulley 99 that are connected together by a belt 101. As the crankshaft 19 drives the drive pulley 97, the belt drives the driven pulleys 99. Preferably, the drive pulley 97 and the driven pulleys 99 have a 2:1 size ratio; however, other suitable sizing ratios can also be used.

A fuel injector 94, which will be described in detail below, communicates with the illustrated induction system downstream of the throttle valve 78 and upstream of the intake ports 88 to supply fuel through nozzles 103 to the air being drawn through the induction system. The fuel injectors 94 generally are controlled in any suitable manner during operation of the engine. As will be described, the fuel injectors 94 can also be controlled prior to engine start-up. Fuel is delivered to the fuel injectors 94 from a fuel tank (not shown) through a first supply line 105 by any suitable fuel pumping arrangement. The chosen pumping arrangement in the illustrated configuration uses a low-pressure pump 107 to effect this first transfer of fuel. The pump 107 transfers the fuel to a vapor separator 96 that separates air from the fuel prior to introduction to the fuel injector 94. This transfer of fuel passes through a transfer line 111.

The vapor separator 96 preferably includes a float valve (not shown) that actuates the low-pressure pump 107 to replenish the fuel supply in the vapor separator when desired. The vapor separator 96 also includes a high-pressure fuel pump 113 that supplies fuel through a second supply line 115 to a fuel rail 117. The high-pressure fuel pump 113 preferably is selectively powered such that it can be turned on and off by a control unit in a manner described below. The fuel rail 117 preferably is in communication with the fuel injectors 94. A return line 119 returns excess fuel from the fuel rail 117 to the vapor separator 96 in a known manner.

With reference again to FIG. 2, the illustrated fuel injectors 94 are provided one per cylinder 48. Of course, two or more can be used for a single cylinder where desired. The illustrated fuel injectors 94 are secured to the induction system with fuel injector holders 98 that are formed integrally with the throttle bodies 76. The illustrated fuel injector holders 98 are formed on a side adjacent the cylinder block 54, but need not be. The fuel injector 94 preferably is positioned along the throttle body 76 so that its spray axis is generally parallel to an axis of the corresponding cylinder 48. Such a mounting arrangement advantageously reduces the lateral dimension of the outboard motor 10. Of course, the fuel injectors 94 can be positioned to inject fuel directly into the combustion chamber 58 (i.e., direct injection) rather than indirectly through the induction system (i.e., indirect injection) and can be positioned in other locations along the induction system.

Having introduced an air/fuel charge into the combustion chamber 56, a suitable ignition system ignites the charge within each combustion chamber 56. Such ignition systems are well known in the art and may include a spark plug 100 extending into the combustion chamber 56.

Following combustion, the exhaust gases must be discharged from the combustion chambers 56 to a point external of the outboard motor 10. Accordingly, the illustrated outboard motor 10 includes an exhaust system that will now be described.

The cylinder heads 56 preferably include exhaust passages 102 that allow exhaust gases to exit the combustion chamber 58 through corresponding exhaust ports 104. In the illustrated engine 16, two exhaust ports 104 are associated with each combustion chamber 58. An exhaust valve 106 is supported by the cylinder head assembly 56 and regulates flow through each exhaust passage 102 and exhaust port 104. An exhaust valve camshaft 108 is journaled within the cylinder head 56 and is adapted to actuate the exhaust valve 106 in a reciprocating manner similar to that of the intake valve 90 and intake valve camshaft 92. In addition, the camshaft 108 preferably is driven in a manner similar to that described above.

With reference now to FIGS. 2–5, the exhaust passages 102 form runners of an exhaust manifold 110. As illustrated, each cylinder bank 50, 52 preferably has a dedicated exhaust manifold 110. A portion of the cylinder head assemblies 56 and a set of manifold covers 112 advantageously define the illustrated exhaust manifolds 110. Of course, a single manifold cover 112 can be used in some applications. More specifically, an exhaust manifold passage 114 that extends in a generally vertical direction is defined in this manner. The passage 114 collects the exhaust gases from each of the combustion chambers 58 flowing through the passages 102.

From the passages 114, the exhaust gases can be passed to a point external to the outboard motor using any suitable exhaust discharge components. For instance, the exhaust gases may be discharged through the exhaust guide 28, into an exhaust pipe (not shown) and then into the body of water in which the watercraft is operating, such as by using a through-the-hub discharge arrangement. Such an arrangement advantageously silences and cools the exhaust gases being discharged.

With reference now to FIG. 1, the present outboard motor 10 also comprises a cooling system that cools both the engine 16 and at least a portion of the exhaust system. As illustrated, the cooling system preferably picks up coolant from the body of water in which the watercraft is operating. Of course, a closed loop cooling system can also be used in some applications.

With reference now to FIG. 1, the drive shaft 32 drives a water pump 140 that preferably is positioned within the drive shaft housing 14. The pump 140 preferably draws water through an inlet port 142 formed in the lower unit 30. This water is delivered to the engine 16 in any suitable manner. The cooling water then can circulate through a variety of cooling jackets and ducts that are arranged to cool components of the engine and exhaust system in known manners.

Figure 4:
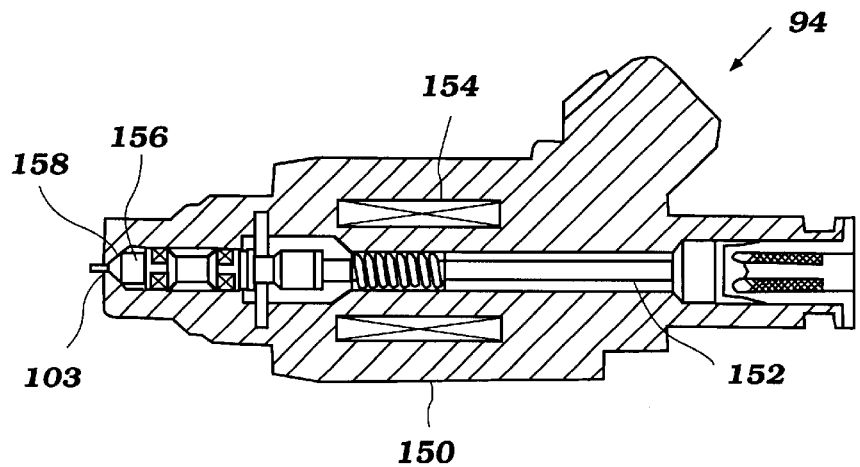
FIG. 4 is a partially sectioned view of a fuel injector and fuel injector mount used in the engine of the outboard motor of FIG. 1.

With reference now to FIG. 4, the fuel injector 94 preferably is solenoid driven. As such, the fuel injector 94 generally comprises an elongated injector body 150. The injector body supports a translatable rod 152. The rod 152 is spring-biased and is used to control a valve body 156 to allow a small amount of fuel to flow at a high pressure in a controlled manner. An electromagnetic solenoid member 154 controls movement of the rod 152 within the injector body 150. The solenoid member 154 operates in a known manner and causes movement of the rod 152 when energized by the application of current to the windings (not shown) of the member 154.

At the end of the injector body 150 having the injector nozzle 103 is positioned the valve body 156. The valve body 156 translates with the fuel injector body 150 and opens and closes the nozzle 103 in a known manner. Specifically, in the illustrated fuel injector 94, the valve body 156 is forced against a valve seat 158 to close the nozzle 103. As the valve body 156 is drawn away from the valve seat 158, high-pressure fuel is allowed to flow through the nozzle 103. The valve body 156, which is connected to the rod 152, is moved as electrical current is applied to the solenoid member 154. As the solenoid member receives current, the rod 152 is moved away from the nozzle 103 against a biasing spring (not shown). As the rod 152 moves, so too does the valve body 156 move. When the electrical current is removed from the solenoid member 154, the biasing spring closes the nozzle 103 by urging the valve body 156 back into contact with the valve seat 158 thereby cutting off the flow of fuel through the nozzle 103.

Figure 5:
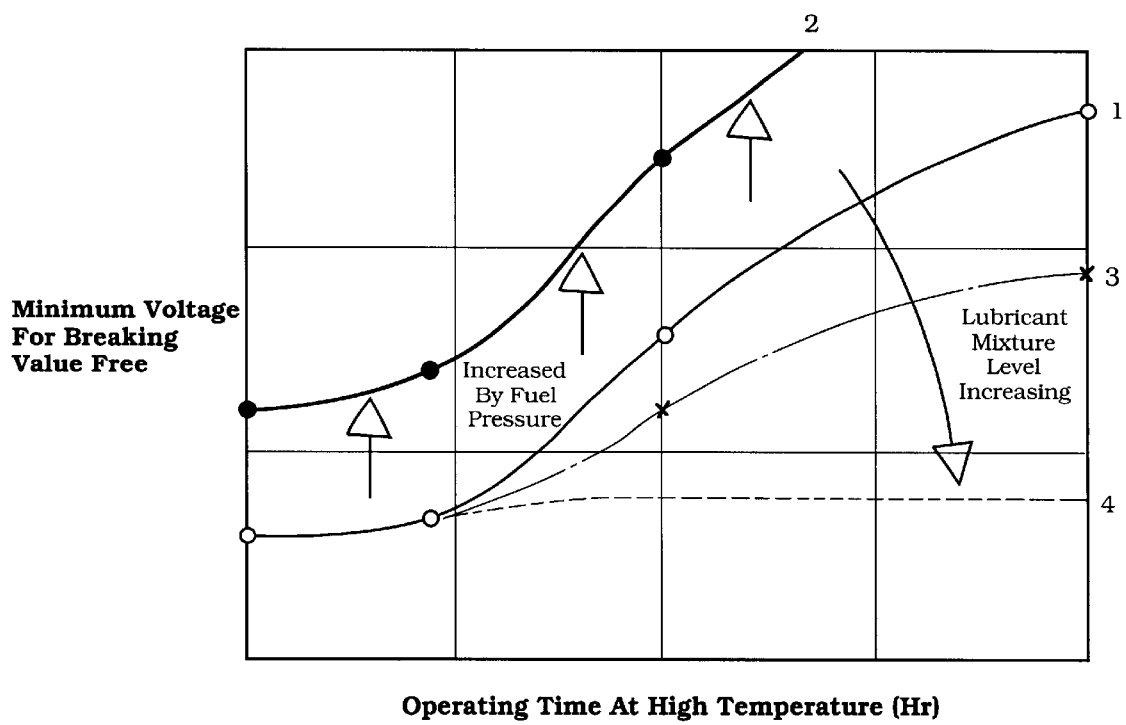
FIG. 5 is a graphical illustration of fuel injector stiction expressed as a function of voltage applied to the fuel injector and a period of time the engine runs at a high temperature.

With reference to FIG. 5, the effect of deposits formed between the valve body 156 and the valve seat 158 of the fuel injector 94 is graphically illustrated. The graph indicates that operating an engine at high temperatures for extended periods of time can cause the deposits that form between the body 156 and the seat 158. As the deposits build over time, increased voltage must be applied to break the bond formed by the deposits. Thus, line 1 represents conditions within the fuel injector during operation over time.

It has been found that if the pressure within the fuel system is increased, the conditions worsen. For instance, under increased pressure within the fuel system, the conditions represented by line 1 in FIG. 5 translate to the conditions represented by line 2. This can be explained, in part, by the increased voltage (and larger fuel injectors) in higher pressure systems as compared to lower pressure fuel supply systems.

With continued reference to FIG. 5, it has also been found that by injecting trace levels of lubricant with the fuel through the injector, the effect of the deposits can be diminished. Of course, the benefits of the mixture likely have an optimal amount. If the amount of lubricant exceeds the optimal amount, the benefits may begin to subside. Thus, by injecting trace amounts of lubricant with the fuel through the fuel injectors, the effects of the deposits can be reduced incrementally as illustrated by lines 1, 3 and 4.

Figure 6:
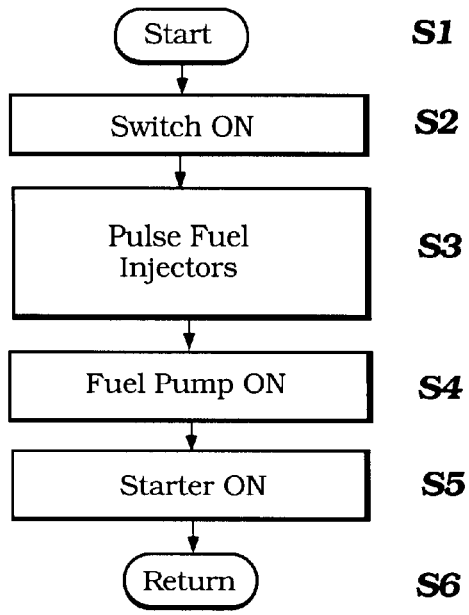
FIG. 6 is a flow diagram of an injector control routine having features, aspects and advantages in accordance with the present invention.

With reference now to FIG. 6, a routine for managing fuel injector stiction is illustrated therein by flowchart. As illustrated, the routine begins in a first step S1 and monitors the position of a main switch (not shown). As is known, the main switch is used to control starting of an engine associated with the switch in many applications. Of course, the position of another switch can also be monitored.

In a step S2, the main switch has been placed in an "ON" position. Accordingly, an operator of the vehicle is evidencing a desire to operate the engine. As discussed above, the present invention seeks to free any frozen fuel injector valve body from its associated valve seat prior to ignition of the engine.

Accordingly, once the switch is placed in the "ON" position, the routine pulses all of the fuel injectors 94. As used herein, pulsing the fuel injectors means applying a burst of current to the solenoid members 154 for a select period of time to actuate the fuel injector valve bodies 156. Of course, other suitable actuation techniques can also be used.

Figure 7:
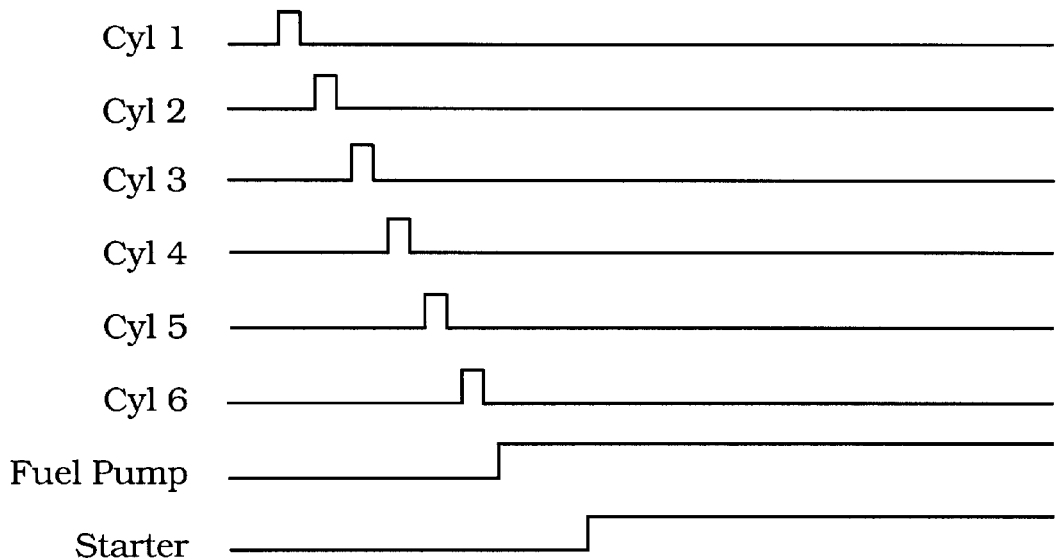
FIG. 7 is a graphical illustration of voltage applied to various engine components under the sequence illustrated by the flow diagram of FIG. 6.

With reference to FIG. 7, the fuel injectors 94 are pulsed one at a time in the illustrated arrangement (i.e., pulsed in sequence). While the illustrated arrangement pulses the cylinders in a particular numbered sequence, it should be readily apparent that other orders or sequences can also be used. Preferably, the fuel injectors 94 are pulsed in a manner such that current is applied to only one fuel injector at a time. More preferably, the only major engine or vehicle component being operated during the pulsing is a single fuel injector 94. For instance, as illustrated, neither the fuel pump nor the starter motor is energized during the pulsing. This allows maximum voltage to be applied to the fuel injector 94. In addition, by not operating the fuel pump, the likelihood of flooding the engine during fuel injector pulsing can be reduced.

With reference again to FIG. 6, after the final cylinder has completed its pulse, the fuel pump is activated in a step S4. In addition, the starter motor is then energized in a step S5. Of course, the two components are representative and can be energized together or in reverse order under certain circumstances. Following initialization of the fuel pump and the starter motor, the routine returns in a step S6 to await future starting of the engine.

Figure 8:
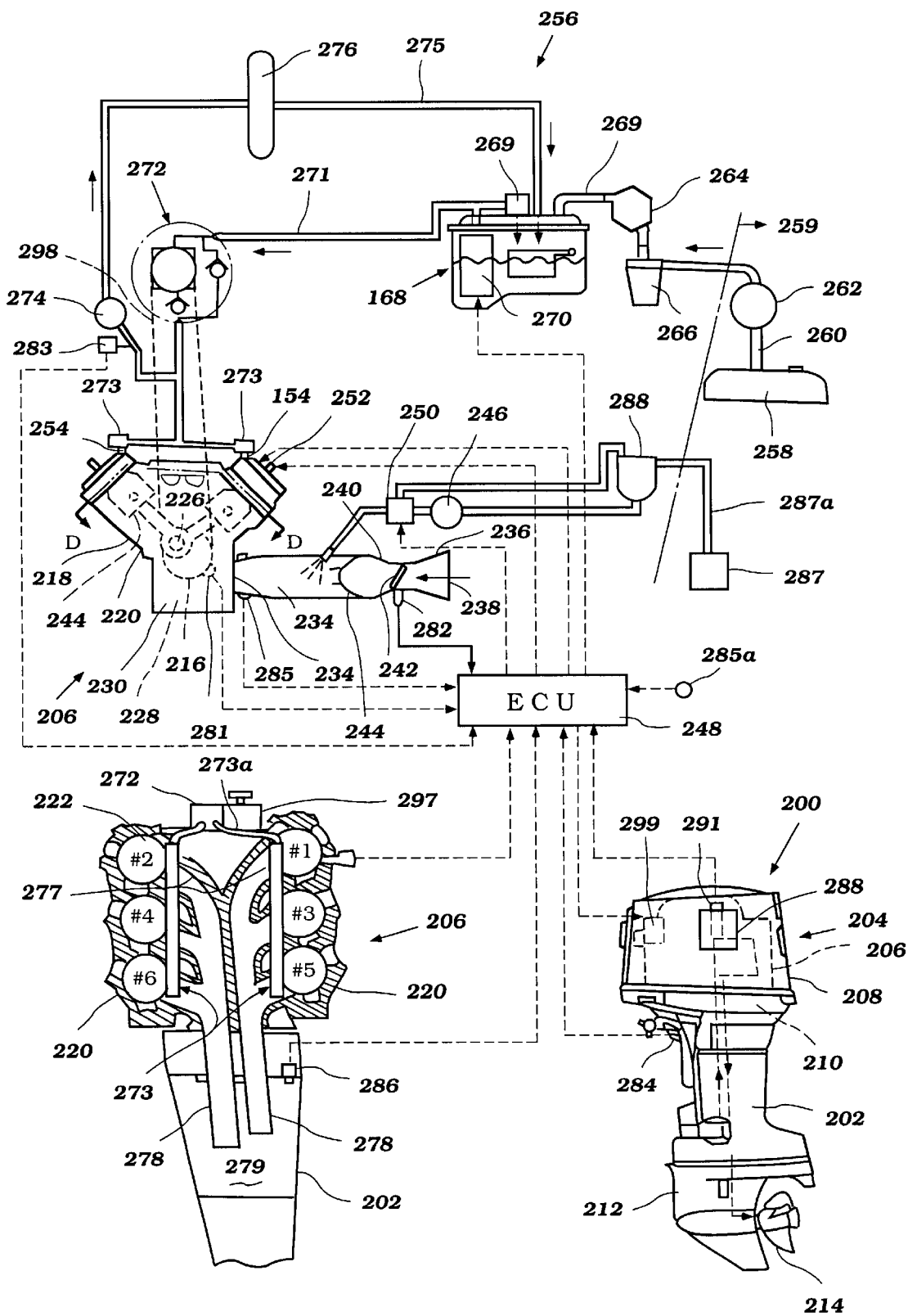
FIG. 8 is a schematic illustration of an outboard motor having a two-cycle direct injected engine arranged and configured in accordance with certain features, aspects and advantages of the present invention.
Figure 9:
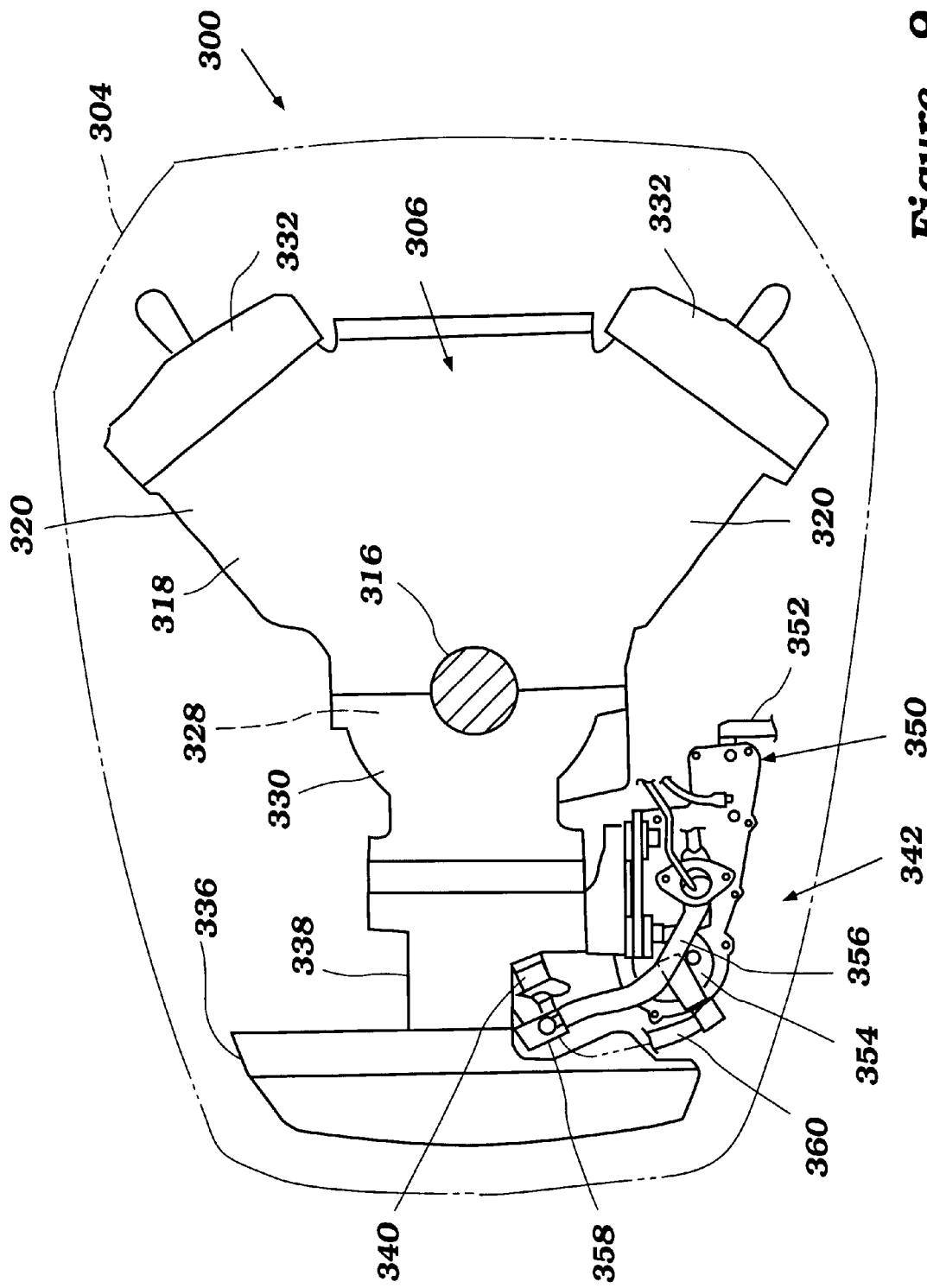
FIG. 9 is a partially sectioned top plan view of an outboard motor having a two-cycle manifold injected engine arranged and configured in accordance with certain features, aspects and advantages of the present invention.
Figure 10:
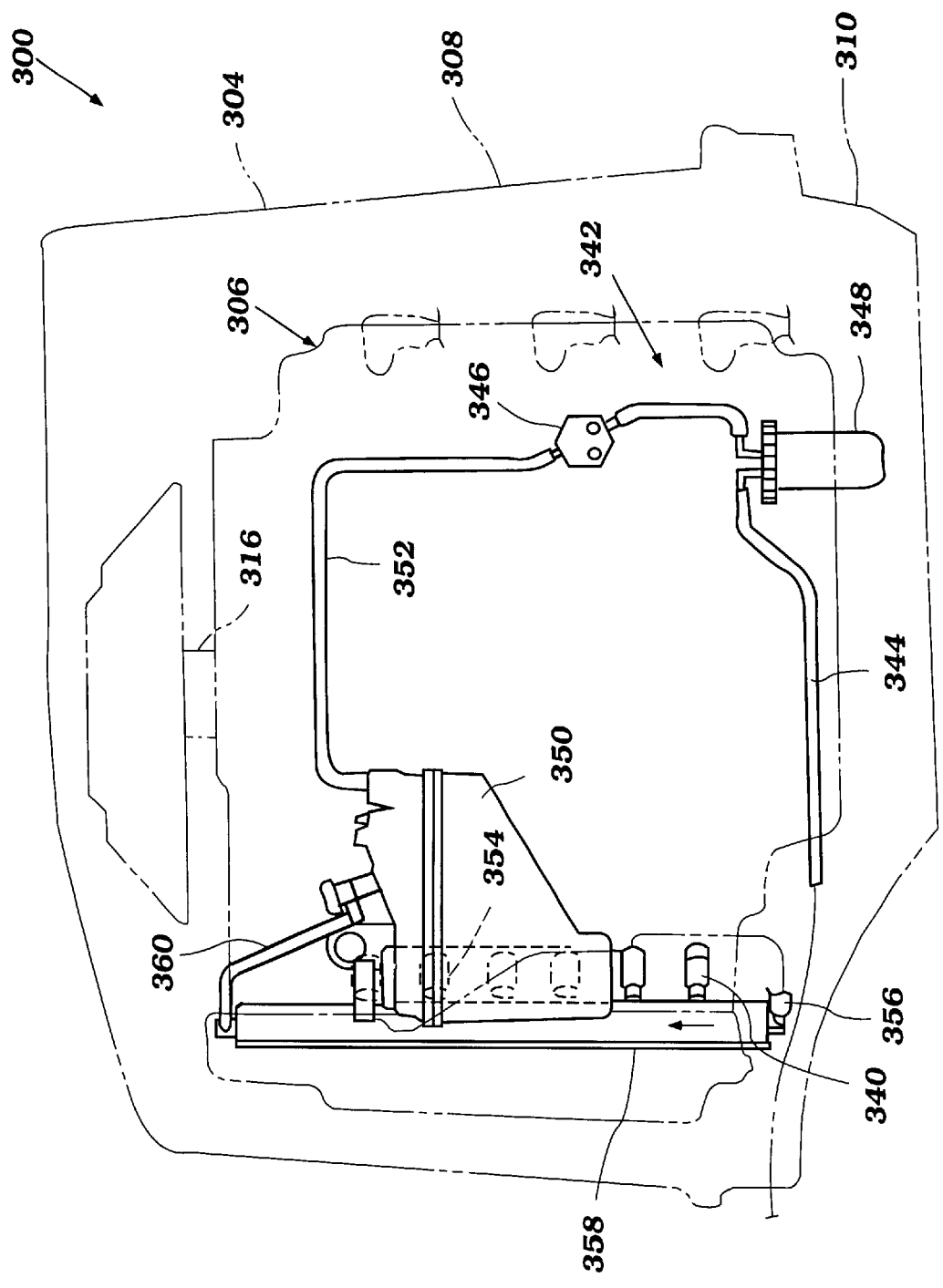
FIG. 10 is a side elevation view of the outboard motor of FIG. 9 illustrating a fuel system layout.

With reference now to FIGS. 8–10, two embodiments of outboard motors employing certain features, aspects and advantages of the present invention are illustrated therein. More specifically, the two outboard motors both feature engines of the two-cycle variety. In one arrangement the two-cycle engine employs direct injection while another arrangement the two-cycle engine features manifold injection. The two outboard motors will now be described in greater detail.

With reference now to FIG. 8, Section A, an outboard motor constructed and operated in accordance with a preferred embodiment of the invention is depicted in side elevation view and is identified generally by the reference numeral 200. The entire outboard motor 200 is not depicted in that the swivel bracket and the clamping bracket, which are associated with the drive shaft housing, indicated generally by the reference numeral 202, are not illustrated. These components are well known in the art, and thus, the specific method by which the outboard motor 200 is mounted to the transom of an associated watercraft is not necessary to permit those skilled in the art to understand or practice the invention.

The outboard motor 200 includes a power head, indicated generally by the reference numeral 204. The power head 204 is positioned above the drive shaft housing 202 and includes a powering internal combustion engine, indicated generally by the reference numeral 206. The engine 206 is shown in more detail in the remaining three sections of FIG. 8 and will be described shortly by reference thereto.

The power head 204 is completed by a protective cowling formed by a main cowling member 208 and a lower tray 210. The main cowling member 208 is detachably connected to the lower tray 210. The lower tray 210 encircles an upper portion of the drive shaft housing 202 and a lower end of the engine 206.

Positioned beneath the drive shaft housing 202 is a lower unit 212 in which a propeller 214, which forms the propulsion device for the associated watercraft, is journaled.

As is typical with outboard motor practice, the engine 206 is supported in the power head 204 so that its crankshaft 216 (see Section B of FIG. 8) rotates about a vertically extending axis. This is done so as to facilitate connection of the crankshaft 216 to a driveshaft which extends into the lower unit 212 and which drives the propeller 214 through a conventional forward, neutral, reverse transmission contained in the lower unit 212.

The details of the construction of the outboard motor and the components that are not illustrated may be considered to be conventional or of any type known to those wishing to utilize the invention disclosed herein. Those skilled in the art can readily refer to any known constructions of such with which to practice the invention.

With reference now in detail to the construction of the engine 206 still by primary reference to FIG. 8, in the illustrated embodiment, the engine 206 is of the V6 type and operates on a two-stroke, crankcase compression principle. Although the invention is described in conjunction with an engine having this cylinder number and cylinder configuration, it will be readily apparent that the invention can be utilized with engines having other cylinder numbers and other cylinder configurations. Also, although the engine 206 will be described as operating on a two-stroke principle, it will also be apparent to those skilled in the art that certain facets of the invention can be employed in conjunction with four-stroke engines, as described above. Some features of the invention also can be employed with rotary type engines.

Now, referring primarily to Sections B and D of FIG. 8, the engine 206 comprises a cylinder block 218 that is formed with a pair of cylinder banks 220. Each of these cylinder banks 220 comprises three vertically spaced, horizontally extending cylinder bores 222. The cylinder bores 222 are numbered #1–6 from top to bottom and will be referred to individually as cylinder 1 etc. Pistons 224 reciprocate in these cylinder bores 222. The pistons 224 are, in turn, connected to the upper or small ends of connecting rods 226. The big ends of these connecting rods are journaled on the throws of the crankshaft 216 in a manner that is well known in this art.

The crankshaft 216 is journaled in a suitable manner for rotation within a crankcase chamber 228 that is formed in part by a crankcase member 230. The crankcase member 230 is affixed to the cylinder block 218 in a suitable manner. As is typical with two-cycle engines, the crankshaft 216 and crankcase chamber 228 are formed with seals so that each section of the crankcase, which is associated with one of the cylinder bores 222, is sealed from the other sections. This type of construction is well known in the art.

While not illustrated, a cylinder head assembly is affixed to an end of each cylinder bank 220 that is spaced from the crankcase chamber 228. These cylinder head assemblies comprise a main cylinder head member that defines a plurality of recesses in its lower face. Each of these recesses cooperate with a respective cylinder bore 222 and the head of the piston 224 to define the combustion chambers of the engine, as is well known in the art. A cylinder head cover member completes the cylinder head assembly. The cylinder head members are affixed to each other and to the respective cylinder banks 220 in a suitable, known manner.

With reference again primarily to FIG. 8, Sections B and C, an air induction system, indicated generally by the reference numeral 232 is provided for delivering an air charge to the sections of the crankcase chamber 228 associated with each of the cylinder bores 222. This communication is via an intake port 234 formed in the crankcase member 230 and registering with each such crankcase chamber section.

The induction system 232 includes an air silencing and inlet device, shown schematically in this figure and indicated by the reference numeral 236. In actual physical location, this device 236 preferably is contained within the cowling 208 at the forward end thereof and has a rearwardly facing air inlet opening 238 through which air is drawn. Air is admitted into the interior of the cowling 208 in a known manner, and this is primarily through a pair of rearwardly positioned air inlets that have a construction that is generally well known in the art.

The air inlet device 236 supplies the induced air to a plurality of throttle bodies 240, each of which has a throttle valve 242 provided therein. These throttle valves 242 are supported on throttle valve shafts. These throttle valve shafts are linked to each other for simultaneous opening and closing of the throttle valves 242 in a manner that is well known in this art.

As is also typical in two-cycle engine practice, the intake ports 234 have, provided in them, reed-type check valves 244. These check valves 244 permit the air to flow into the sections of the crankcase chamber 228 when the pistons 224 are moving upwardly in their respective cylinder bores. However, as the pistons 224 move downwardly, the charge will be compressed in the sections of the crankcase chamber 228. At that time, the reed type check valve 244 will close so as to permit the charge to be compressed.

Preferably, an oil pump 246 pumps oil to a solenoid valve unit 250. In the preferred embodiment, the crankshaft 216 drives the oil pump 246; however, an electric oil pump can be used in the alternative. The solenoid valve unit 250 regulates the delivery of oil to the throttle body 240 of each cylinder 222. The oil passes through the throttle body 240 and into the crankcase chamber 228 to lubricate the components of each cylinder 222. An ECU (Electronic Control Unit) 248 sends control signals through a number of drive signal lines 249 to the solenoid valve unit 250 to regulate the timing of oil delivery to each cylinder 222.

The charge which is compressed in the sections of the crankcase chamber 228 is then transferred to the combustion chamber through a scavenging system (not shown) in a manner that is well known. A spark plug 252 is mounted in the cylinder head assembly 202 for each cylinder bore. The spark plug 252 is fired under the control of the ECU 248. The ECU 248 receives certain signals for controlling the time of firing of the spark plugs 252 in accordance with any desired control strategy.

The spark plug 252 ignites a fuel air charge that is formed by mixing fuel directly with the intake air via a fuel injector 254. The fuel injectors 254 are solenoid type injectors and electrically operated. The fuel injectors 254 preferably are constructed as illustrated in FIG. 4. Of course, other suitable constructions can also be used.

The ECU 248 controls the timing and the duration of fuel injection. The ECU 248 thus controls the opening and closing of the solenoid valves of the fuel injectors 254, and in particular, controls the selective supply of current to the solenoids of the fuel injectors 254.

With reference to Sections C and D of FIG. 8, fuel is supplied to the fuel injectors 254 by a fuel supply system, indicated generally by the reference numeral 256. The fuel supply system 256 comprises a main fuel supply tank 258 that is provided in the hull 259 of the watercraft with which the outboard motor 200 is associated. Fuel is drawn from this tank 258 through a conduit 260 by a first low-pressure pump 262 and a plurality of second low-pressure pumps 264. The first low pressure pump 262 is a manually operated pump and the second low pressure pumps 264 are diaphragm type pumps operated by variations in pressure in the sections of the crankcase chamber 228, and thus provide a relatively low pressure. A quick disconnect coupling is provided in the conduit 260 and a fuel filter 266 is positioned in the conduit 260 at an appropriate location.

From the low-pressure pump 264, fuel is supplied to a vapor separator 268, which is mounted on the engine 206 or within the cowling 208 at an appropriate location. This fuel is supplied through a line 269, and a float valve regulates fuel flow through the line 269. The float valve is operated by a float that disposed within the vapor separator 268 so as to maintain a generally constant level of fuel in the vapor separator 268.

A high pressure electric fuel pump 270 is provided in the vapor separator 268 and pressurizes fuel that is delivered through a fuel supply line 271 to a high pressure fuel pump, indicated generally by the reference numeral 272. The electric fuel pump 270, which is driven by an electric motor, develops a pressure such as 3 to 10 kg/cm2. A low pressure regulator 269 is positioned in the line 271 at the vapor separator 268 and limits the pressure that is delivered to the high pressure fuel pump 272 by dumping the fuel back to the vapor separator 268.

With reference to Section D of FIG. 8, fuel is supplied from the high-pressure fuel pump 272 to a pair of vertically extending fuel rails 273 through a flexible pipe 273a. The pressure in the high pressure delivery system 272 is regulated by a high pressure regulator 274 which dumps fuel back to the vapor separator 268 through a pressure relief line 275 in which a fuel heat exchanger or cooler 276 is provided.

After the fuel charge has been formed in the combustion chamber by the injection of fuel from the fuel injectors 254, firing the spark plugs 252 fires the charge. The injection timing and duration, as well as the control for the timing of firing of the spark plugs 252, are controlled by the ECU 248.

Once the charge burns and expands, the pistons 224 will be driven toward the crankcase in the cylinder bores until the pistons 224 reach the lowermost position (i.e., Bottom Dead Center). Through this movement, an exhaust port (not shown) is opened to communicate with an exhaust passage 277 (see the lower left-hand view—Section D) formed in the cylinder block 218.

The exhaust gases flow through the exhaust passages 277 to collector sections of respective exhaust manifolds that are formed within the cylinder block 218. These exhaust manifold collector sections communicate with exhaust passages formed in an exhaust guide plate on which the engine 206 is mounted.

A pair of exhaust pipes 278 extend the exhaust passages 277 into an expansion chamber 279 formed in the drive shaft housing 202. From this expansion chamber 279, the exhaust gases are discharged to the atmosphere through a suitable exhaust system. The length of the exhaust pipe 278, from the cylinder 222 to the end of the exhaust pipe 278, differs between some or all of the cylinders 222. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

Any type of desired control strategy can be employed for controlling the time and duration of fuel injection from the injector 254 and timing of firing of the spark plug 252; however, a general discussion of some engine conditions that can be sensed and some other ambient conditions that can be sensed for engine control will follow. It is to be understood, however, that those skilled in the art will readily understand how various control strategies can be employed in conjunction with the components of the invention.

The control for the fuel air ratio preferably includes a feedback control system. Thus, a combustion condition or oxygen sensor 280 is provided and determines the in-cylinder combustion conditions by sensing the residual amount of oxygen in the combustion products at about a time when the exhaust port is opened. A line carries this output signal to the ECU 248, as schematically illustrated in FIG. 8.

As seen in Section B of FIG. 8, a crank angle position sensor 281 measures the crank angle and transmits it to the ECU 248, as schematically indicated. Engine load, as determined by throttle angle of the throttle valve 242, is sensed by a throttle position sensor 282, which outputs a throttle position or load signal to the ECU 248.

There is also provided a pressure sensor 283 communicating with the fuel line connected to the pressure regulator 274. This pressure sensor 283 outputs the high-pressure fuel signal to the ECU 248 (signal line is omitted). There also may be provided a trim angle sensor 284 (see the lower right-hand view) which outputs the trim angle of the motor to the ECU 248. Further, an intake air temperature sensor 285 (see the upper view—Section B) may be provided and this sensor 285 outputs an intake air temperature signal to the ECU 248. An atmospheric pressure sensor 285a measures the atmospheric pressure of the ambient air and transmits a signal representing the pressure to the ECU 248. There may also be provided a backpressure sensor 286 that outputs exhaust backpressure to the ECU 248.

The sensed conditions are merely some of those conditions which may be sensed for engine control and it is, of course, practicable to provide other sensors such as, for example, but without limitation, an engine height sensor, a knock sensor, a neutral sensor, a watercraft pitch sensor and an atmospheric temperature sensor in accordance with various control strategies.

The ECU 248 computes and processes the detection signals of each sensor based on a control map. The ECU 248 forwards control signals to the fuel injector 254, spark plug 252, the electromagnetic solenoid valve unit 250, and the high-pressure electric fuel pump 270 for their respective control. Respective control lines that are indicated schematically in FIG. 8 carry these control signals.

A pump drive 297 is provided to drive the fuel pump 272. The drive 297 powers the pump 272 through the use of a drive belt 298 in any suitable manner. Of course, other driving arrangements can also be used. In addition, a starter motor 299 is provided to start the engine when desired. The starter motor 299 engages with and rotates a flywheel (not shown) that is connected to the crankshaft 216.

The oil injection system of the present invention will now be described with reference to FIG. 8. As best viewed in Section C of FIG. 8, an oil sub tank 287 located in the hull of the watercraft serves as a reservoir of lubrication oil for the engine 206. A suitable delivery pump supplies oil from the oil sub tank 287 through an oil supply pipe 287a to a main oil tank 288 mounted to the side of the cylinder block 218. The delivery pump can be located within the oil sub tank 287 or can be positioned within the supply pipe 287a, and, for example, can be either electrically or mechanically driven. An oil feed pipe 289 supplies oil from the bottom of the main oil tank 288 to the oil pump 246. The oil pump 246 in turn supplies oil to the solenoid valve unit 250, which regulates the flow of oil to the cylinders 222. The solenoid valve unit 250 is preferably controlled via control signals from the ECU 248. As best viewed in Section A of FIG. 8, an oil level sensor 291 relays the level of oil in the main oil tank 288 to the ECU 248.

With reference now to FIGS. 9 and 10, a further two-cycle engine will be generally described. As many of the features of the engine of FIGS. 9 and 10 are similar to the engine of FIG. 8, a variety of components will not be described. It should be readily apparent to one of ordinary skill in the art that a variety of components can be interchanged both between the two two-cycle engines and among the four-cycle engine and the two illustrated two-cycle engines.

With reference initially to FIG. 9, an outboard motor constructed and operated in accordance with a preferred embodiment of the invention is depicted therein and is identified generally by the reference numeral 300. The outboard motor 300 includes a power head, indicated generally by the reference numeral 304. The power head 304 is positioned above a drive shaft housing (not shown) and includes a powering internal combustion engine, indicated generally by the reference numeral 306.

The power head 304 is completed by a protective cowling formed by a main cowling member 308 and a lower tray 310. The main cowling member 308 is detachably connected to the lower tray 310. The lower tray 310 encircles an upper portion of the drive shaft housing and a lower end of the engine 306.

As is typical with outboard motor practice, the engine 306 is supported in the power head 304 so that its crankshaft 316 rotates about a vertically extending axis. This is done so as to facilitate connection of the crankshaft 316 to a driveshaft, as described above.

The details of the construction of the outboard motor and the components that are not illustrated may be considered to be conventional or of any type known to those wishing to utilize the invention disclosed herein. Those skilled in the art can readily refer to any known constructions of such with which to practice the invention.

The engine 306 preferably is of the V6 type and operates on a two-stroke, crankcase compression principle. Although the invention is described in conjunction with an engine having this cylinder number and cylinder configuration, it will be readily apparent that the invention can be utilized with engines having other cylinder numbers and other cylinder configurations. Also, although the engine 306 will be described as operating on a two-stroke principle, it will also be apparent to those skilled in the art that certain facets of the invention can be employed in conjunction with four-stroke engines, as described above. Some features of the invention also can be employed with rotary type engines.

The engine 306 generally comprises a cylinder block 318 that is formed with a pair of cylinder banks 320. Pistons (not shown) that reciprocate within cylinder bores (not shown) drive the crankshaft 316 in a known manner. The crankshaft 316 is journaled in a suitable manner for rotation within a crankcase chamber 328 that is formed in part by a crankcase member 330. The crankcase member 330 is affixed to the cylinder block 318 in a suitable manner.

As is typical with two-cycle engines, the crankshaft 316 and crankcase chamber 328 are formed with seals so that each section of the crankcase, which is associated with one of the cylinder bores, is sealed from the other sections. This type of construction is well known in the art.

A cylinder head assembly 332 is affixed to an end of each cylinder bank 220 that is spaced from the crankcase chamber 228. These cylinder head assemblies comprise a main cylinder head member that defines a plurality of recesses in its lower face. Each of these recesses cooperate with a respective cylinder bore and the head of the piston to define the combustion chambers of the engine, as is well known in the art. A cylinder head cover member completes the cylinder head assembly. The cylinder head members are affixed to each other and to the respective cylinder banks 220 in a suitable, known manner.

An air induction and fuel supply system is provided for delivering an air-fuel charge to the sections of the crankcase chamber 228 associated with each of the cylinder bores. The system includes an air silencing and inlet device 336. The air inlet device 336 supplies the induced air in a known manner to the crankcase chambers through an intake manifold 338. A plurality of runners (not shown) preferably extend between the inlet device 336 and the crankcase chambers such that each chamber has a dedicated runner.

A fuel injector 340 desirably is positioned within each of the runners of the manifold 338. The fuel injectors provide for manifold injection in the illustrated arrangement. In addition, the fuel injectors can be mounted within the manifold in any suitable manner. Further description of the induction system is unnecessary in view of the above description.

With continued reference to FIGS. 9 and 10, fuel is supplied to the fuel injectors 340 by a fuel supply system, indicated generally by the reference numeral 342. The fuel supply system 342 comprises a main fuel supply tank (not shown) that is provided in the hull of the watercraft with which the outboard motor 300 is associated. Fuel is drawn from this tank (not shown) through a conduit 344 by a low-pressure pump 346. The first low-pressure pump 346 is a diaphragm type pump operated by variations in pressure in the sections of the crankcase chamber 228, and thus provides a relatively low pressure. Of course, other fuel pumps can also be used to assist in the transfer of fuel. In the illustrated arrangement, the fuel passes through a fuel filter 348 prior to reaching the low-pressure pump 346.

From the low-pressure pump 348, fuel is supplied to a vapor separator 350 through a further supply line 352. The vapor separator 350 is mounted on the engine 306 or within the cowling 308 at an appropriate location. Preferably, a float valve regulates fuel flow through the line 352 into the vapor separator 350. The float valve is operated by a float that disposed within the vapor separator 350 so as to maintain a generally constant level of fuel in the vapor separator 350.

A high-pressure electric fuel pump 354 is provided in the vapor separator 350 and pressurizes fuel that is delivered through a fuel supply line 356. The electric fuel pump 354, which is driven by an electric motor, develops a pressure such as 3 to 10 kg/cm2.

Fuel is supplied from the high-pressure fuel pump 354 to a pair of vertically extending fuel rails 358. A high-pressure regulator that dumps fuel back to the vapor separator 350 through a pressure relief line 360 regulates the pressure in the high-pressure delivery system.

The motor 300 also includes a cooling system, a lubrication system, an electrical system and a variety of other systems that will not be described. It should be appreciated that a variety of components described above can also be used within the environment of the present motor 300. Accordingly, further description of the motor is deemed unnecessary.

Figure 11:
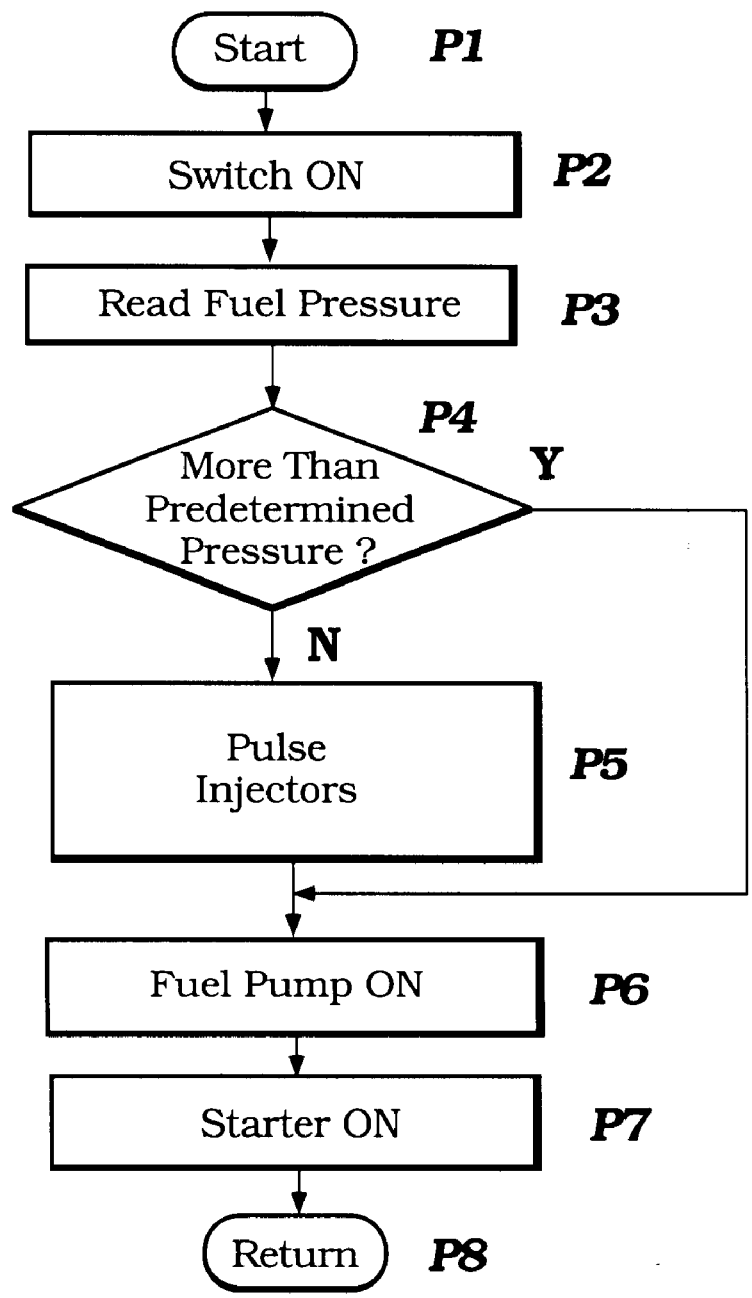
FIG. 11 is a flow diagram of another injector control routine having features, aspects and advantages in accordance with the present invention.

With reference now to FIG. 11, another routine for managing fuel injector stiction is illustrated therein by flowchart. As discussed above in the context of FIG. 6, the routine preferably cycles or pulses the fuel injectors of an engine to loosen the fuel injector bodies from the fuel injector valve seats prior to ignition of the engine. As illustrated, the routine begins in a first step P1 and monitors the position of a main switch (not shown). As is known, the main switch is used to control starting of an engine associated with the switch in many applications. Of course, the position of another switch can also be monitored. For instance, a pre-start switch could be arranged to allow an operator to selectively activate the injector pulse feature.

In a step P2, the main switch has been placed in an "ON" position. Accordingly, an operator of the vehicle is evidencing a desire to operate the engine. As discussed above, the present invention seeks to free any frozen fuel injector valve body from its associated valve seat prior to ignition of the engine. The CPU, or other processor, then determines the fuel pressure within the fuel supply lines. For instance, in FIG. 8, sensor 283 can be polled to determine the actual pressure within the high-pressure supply lines. Over time, the pressure within such lines tends to decrease. Accordingly, by comparing the actual pressure within the high pressure supply lines, for instance, against a predetermined value, the CPU can determine whether the engine has been recently shutdown or whether the engine has been shutdown for a longer period of time.

Accordingly, in a step P4, the CPU evaluates whether the measured pressure within the fuel supply system component (i.e., the high-pressure fuel supply line) is greater than a predetermined pressure. If so, the routine skips the pulsing of the fuel injectors. This is because the elevated pressure indicates that the engine was not shut down a sufficient period of time to require the valve body freeing cycling.

If the measured pressure is below the predetermined pressure, however, the routine proceeds to pulse the fuel injectors. As discussed above, pulsing the fuel injectors generally means applying a burst of current to the solenoid members of the fuel injector for a select period of time to actuate the fuel injector valve bodies. Of course, other suitable actuation techniques can also be used. Preferably, the fuel injectors are pulsed one at a time in the illustrated arrangement (i.e., pulsed in sequence). While the illustrated arrangement pulses the cylinders in a particular numbered sequence, it should be readily apparent that other orders or sequences can also be used. Preferably, the fuel injectors are pulsed in a manner such that current is applied to only one fuel injector at a time. More preferably, the only major engine or vehicle component being operated during the pulsing is a single fuel injector. For instance, as illustrated, neither the fuel pump nor the starter motor is energized during the pulsing. This allows maximum voltage to be applied to the fuel injector. In addition, by not operating the fuel pump, the likelihood of flooding the engine during fuel injector pulsing can be reduced.

With continued reference to FIG. 11, after the final cylinder has completed its pulse, the fuel pump is activated in a step P6. In addition, the starter motor is then energized in a step P7. Of course, the two components should be considered representative of many other components that can be activated and can be energized together or in reverse order under certain circumstances. Following initialization of the fuel pump and the starter motor, the routine returns in a step P8 to await future starting of the engine.

One of ordinary skill in the art should readily appreciate that the present routines should operate to improve injector performance and engine life. In addition, by cycling the injectors individually, a maximum voltage can be applied to each injector such that the accumulated coke or other deposits can be broken by the force applied through the solenoid of the fuel injector. It is anticipated that the level of voltage necessary to break the fuel injector valve body free of the deposits under various operating conditions can be roughly determined through testing. Accordingly, the level of voltage available can be tuned to a particular level depending upon the characteristics of the previous period of operation and non-use.

Although this invention has been described in terms of certain preferred embodiments, other embodiments apparent to those of ordinary skill in the art are also within the scope of this invention. In addition, not all features, aspects or advantages of the present invention are necessarily required to practice certain portions of the present invention. Moreover, while the invention has been described separately in the context of two-cycle engines and four-cycle engines and directly injected and indirectly injected engines, it should be appreciated that some of the features of a particular illustrated embodiment can find utility in other illustrated embodiments. Accordingly, the scope of the present invention is intended to be defined only by the claims that follow.

What is claimed is:

1. A fuel injected, internal combustion engine comprising an engine body defining at least one cylinder bore in which a piston reciprocates, a cylinder head attached to an end of the cylinder bore so as to define a combustion chamber with said piston, a fuel injector selectively communicating with the combustion chamber to provide a fuel charge, an electronic controller coupled to the fuel injector and controlling the operation of the fuel injector, and at least one additional electrical component coupled to and controlled by the electronic controller, the electronic controller being configured to energize the fuel injector through at least one cycle before the electrical component is energized at the time of engine startup.

2. An engine as in claim 1, wherein the electrical component is a starter motor.

3. An engine as in claim 1, wherein the electrical component is a fuel pump that supplies fuel to the fuel injector.

4. An engine as in claim 3 additionally comprising a starter motor, and the electronic controller is configured to run the fuel injector through at least one cycle before the fuel pump and the starter motor are energized at the time of engine startup.

5. An engine as in claim 4, wherein the electronic controller is configured to energize the fuel pump before the starter motor.

6. An engine as in claim 1 additionally comprising a fuel supply system that supplies pressured fuel to the fuel injector, and the electronic controller further being configured to determine whether a fuel pressure within the fuel supply system exceeds a predetermined fuel pressure, and to energize the fuel pump and starter motor before the fuel injector when the fuel pressure exceeds the predetermined fuel pressure at the time of engine startup.

7. An engine as in claim 1 additionally comprising a fuel supply system that supplies pressured fuel to the fuel injector, and the electronic controller further being configured to determine whether a fuel pressure within the fuel supply system is lower than a predetermined fuel pressure, and to energize the fuel injector before the fuel pump and starter motor when the fuel pressure is lower than the predetermined fuel pressure at the time of engine startup.

8. An engine as in claim 1, wherein the electronic controller is configured to repeat the cycling of the fuel injector each time the engine is started.

9. An engine as in claim 1 additionally comprising additional combustion chambers defined by additional cylinder bore in which corresponding pistons reciprocate, additional fuel injector selectively communicating with corresponding combustion chambers, and the electronic controller further being configured to energize the fuel injectors through at least one cycle before the electrical component is energized at the time of engine startup.

10. An engine as in claim 8, wherein the electronic controller is further configured to energize each fuel injector in an order corresponding to the arrangement of the cylinder bores.

11. An engine as in claim 1, wherein the fuel injector is disposed on the engine to spray fuel into the combustion chamber.

12. An engine as in claim 1 additionally comprising an induction system with an intake passage selectively communicating with the combustion chamber, and the fuel injector is disposed on the engine to spray fuel into the intake passage.

13. An engine as in claim 12 additionally comprising a reciprocating valve to selectively place the intake path in communication with the combustion chamber.

14. A method of controlling startup of a fuel injected engine comprising:

cycling each fuel injector of the engine by applying a voltage for a predetermined period to a solenoid of each fuel injector;

energizing a fuel pump after cycling the fuel injectors; and energizing a starter motor after cycling the fuel injectors.

15. A method as in claim 14, wherein the fuel pump is energized before the starter motor.

16. A method as in claim 14 additionally comprising determining whether a fuel pressure within the fuel supply system exceeds a predetermined fuel pressure, and energizing the fuel pump and the starter motor before the fuel injector when the fuel pressure exceeds the predetermined fuel pressure at the time of engine startup.

17. A method as in claim 14, wherein the fuel injectors are cycled each time the engine is started.

18. A method as in claim 14, wherein the fuel injectors are cycled according to a predetermined ignition sequence followed during operation of the engine.

19. A method as in claim 14, wherein each fuel injector is cycled only once prior to energizing the fuel pump.

20. A method as in claim 14, wherein each fuel injector is cycled only once prior to energizing the starter motor.

* * * * *